United States Patent
Stauffer et al.

(10) Patent No.: US 7,665,346 B1
(45) Date of Patent: Feb. 23, 2010

(54) METHOD AND APPARATUS FOR DETECTING LEAKS IN BLISTER PACKS USING VACUUM AND VISION TESTING

(75) Inventors: Anton Stauffer, Bedford, NY (US); Oliver Stauffer, Bedford, NY (US); Mikhail Knellar, Bronx, NY (US)

(73) Assignee: Packaging Technologies & Inspection, LLC, Tuckahoe, NY (US)

( * ) Notice: Subject to any disclaimer, the term of this patent is extended or adjusted under 35 U.S.C. 154(b) by 243 days.

(21) Appl. No.: 11/987,270

(22) Filed: Nov. 28, 2007

Related U.S. Application Data

(60) Provisional application No. 60/861,428, filed on Nov. 29, 2006.

(51) Int. Cl.
*G01M 3/32* (2006.01)
(52) U.S. Cl. ...................................... 73/49.3
(58) Field of Classification Search ................ 73/49.3; 206/461
See application file for complete search history.

(56) References Cited

U.S. PATENT DOCUMENTS

| | | | | |
|---|---|---|---|---|
| 4,803,868 A | * | 2/1989 | Vinton et al. ................. | 73/49.3 |
| 4,850,696 A | * | 7/1989 | Yamato et al. ........... | 356/237.1 |
| 4,907,443 A | * | 3/1990 | Pailler ........................... | 73/52 |
| 5,082,366 A | * | 1/1992 | Tyson et al. ................. | 356/35.5 |
| 5,361,626 A | * | 11/1994 | Colligan et al. .............. | 73/40.7 |
| 5,363,968 A | * | 11/1994 | Soloman ..................... | 209/546 |
| 5,763,765 A | * | 6/1998 | Lamont et al. ............... | 73/40.7 |
| 5,880,359 A | * | 3/1999 | Kono et al. .................. | 73/49.3 |
| 6,167,751 B1 | * | 1/2001 | Fraim et al. .................. | 73/49.3 |
| 6,687,622 B2 | * | 2/2004 | Parker ......................... | 702/36 |
| 6,763,702 B2 | * | 7/2004 | Chien et al. .................. | 73/40.7 |
| 6,920,793 B2 | * | 7/2005 | Stauffer ....................... | 73/630 |
| 7,017,391 B2 | * | 3/2006 | Klein et al. .................. | 73/40.7 |
| 2003/0033857 A1 | * | 2/2003 | Franks ........................ | 73/49.3 |

* cited by examiner

*Primary Examiner*—John Fitzgerald
(74) *Attorney, Agent, or Firm*—Dowell & Dowell, P.C.

(57) ABSTRACT

A method and apparatus for detecting leaks in blister packages wherein a package is supported with a support chamber and a flexible and imperforate bladder is placed over the package after which at least a partial vacuum pressure is applied and a measure made to determine if any leakage is detected while an image of the bladder is detected, such as by a camera, with the image being used to provide a visual indication of the location of a failure in the blister package.

8 Claims, 2 Drawing Sheets

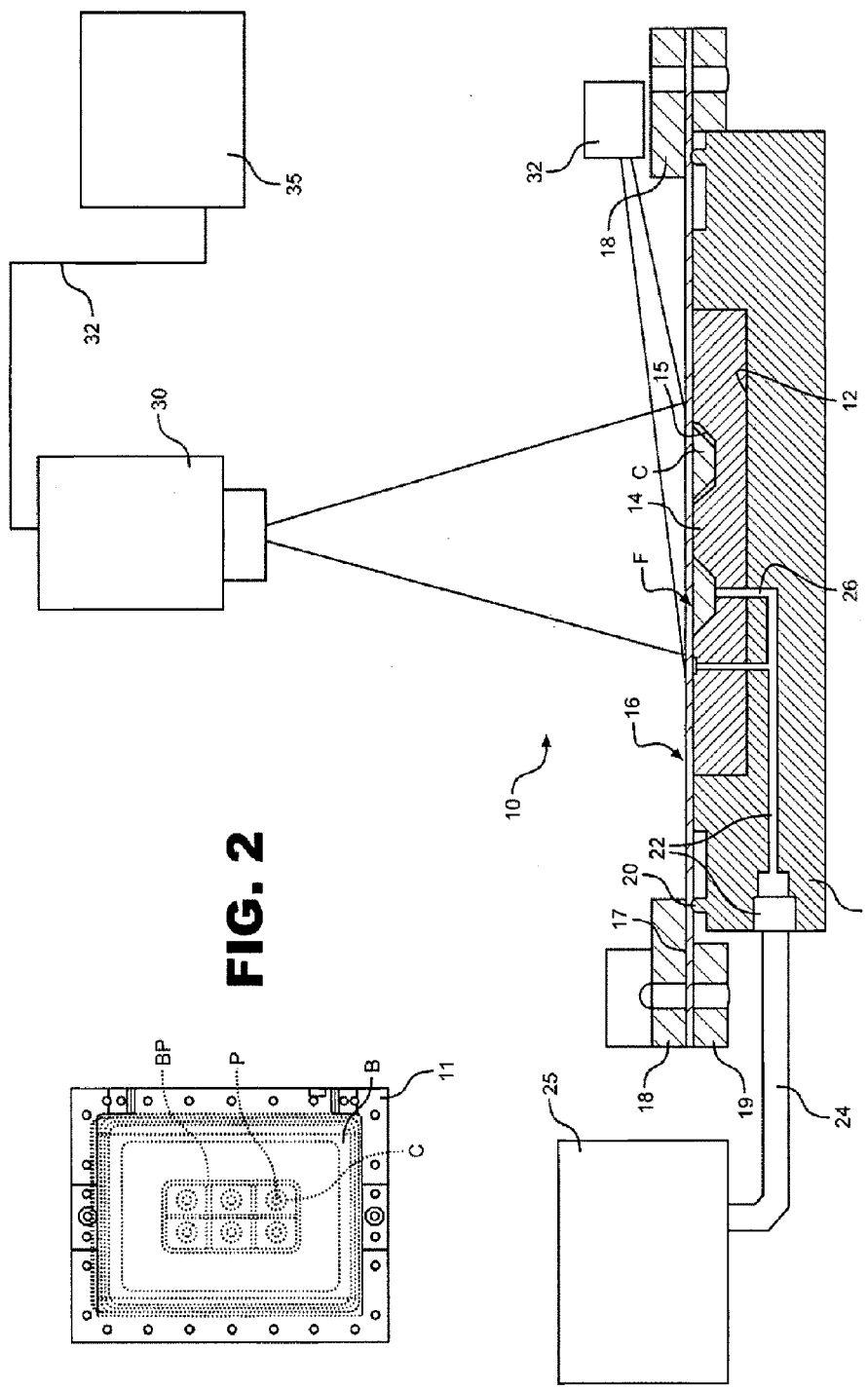

METHOD AND APPARATUS FOR DETECTING LEAKS IN BLISTER PACKS USING VACUUM AND VISION TESTING

BACKGROUND OF THE INVENTION

1. Field of the Invention

The invention is related to non-destructively testing the integrity of package seals and particularly to testing small semi-rigid, flexible, and multi-cavity blister packages for defects of all sizes using vacuum and vision testing.

2. Brief Description of the Related Art

Differential pressure vacuum leak detection is commonly used to detect leaks in hermetically sealed packages. However, to detect leaks in packaging using vacuum leak detection, ample air must be contained inside the package to reliably detect defective packages. Small semi-rigid, flexible, and multi-cavity blister packages do not have enough air inside the package to reliably detect defects by simple vacuum decay methods.

The Ratio of air in the package to air in the chamber must be as large as possible for sensitive and accurate leak testing. Flexible chamber walls allow for the chamber to adjust to a flexible package area, but are still unable to be reliable with certain packages. Due to the small amount of air present in a blister cavity, the flexible chamber may evacuate the air from the cavity, equalizing the pressure before any measurements can take place. Methods of testing multi-cavity blister packages and other small packages using flexible chambers and vacuum decay, although not destructive, do not reliably detect large leaks.

Water submersion testing is also used to test small packages, which is destructive to the product as well and does not provide accurate results. Water submersion detects defects by having an operator visually observe air bubbles produced from submerged packages, which is unreliable and does not detect small defects. Water submersion inspection of all packages during production is not possible in most cases due to the destructive nature of the test.

In both of these foregoing detection methods, there is no indication of which blister cavity is defective and the reliability of the test results cannot be guaranteed. The location of a leak or package defect is beneficial to the process and control of packaging.

Non-contact sensor applications are capable of detecting the location of defective blister cavities, but are not reliable and effective for several reasons. The high sensitivity of the displacement sensors and the critical positioning of product inside the cavities may produce false measurements. Laser deflection is very sensitive to print and reflectivity of the surface material of the blister pack and may not be a suitable solution for certain materials.

Non-contact sensor methods can be destructive depending on the vacuum levels used during testing. If the product has a leak, the activity of the flexible blister cavity material is unpredictable due to equalization of the pressure inside the cavity. The cavity material may remain domed after pressure has equalized producing false results. If the non-contact sensor application requires pulling higher levels of vacuum without supporting the flexible package area with a flexible chamber wall, a package material may experience plastic deformation, in which it maintains a stretched position. These arguments apply to all testing processes that use non-contact sensory technology combined with controlled pressure environments such as disclosed in U.S. Pat. Nos. 6,687,622 B2; 5,082,366; 5,363,968; 6,167,751; 5,880,359; 5,763,765; 4,907,443; 6,763,702; and 4,850,696; United States Published Applications 2004/0057043A1 and 2004/0057043A1; and JP 406258175A.

In view of the foregoing, prior technology and methods of testing packaging for leaks are destructive, contingent on the properties of the package material, not sensitive enough for small packages and unreliable under certain circumstances.

SUMMARY OF THE INVENTION

A method and apparatus for detecting leaks in small semi-rigid, flexible, and multi-cavity blister packages using a test chamber in which a bladder or flexible chamber wall adjusts to the shape of the package. A package is placed in the test chamber and a vacuum is pulled within the chamber to detect the presence of leaks in seals of pouches formed in a blister package using a combination of vacuum measurements and displacement of the flexible bladder. The flexible portion or bladder of the test chamber is exposed to show the profile of a flexible portion of the blister package inside the test cavities defined within a support tooling. Once a defined vacuum is pulled, a proximity sensor, vision camera, or ultrasound measurement detects the displacement of the flexible portion of the package. The test also involves measuring the absolute and differential pressure of the test chambers. The flexible bladder provides for better accuracy and the non-destructive nature of a vacuum test, while also providing an indicative physical profile of the flexible portion of the blister package under test. Based on these two measurements, small semi-rigid, flexible, and multi-cavity blister packages with defects of all sizes can be detected non-destructively.

The testing unit of the invention not only includes the vacuum support tooling with a flexible bladder cover and a device to pull at least a partial vacuum within pouch supporting cavities or chambers within the support tooling, but a low angle light fixture is also provided for use with a pattern recognition camera. After a package is placed in the test chambers of the tooling, a flexible bladder is placed as a cover for the test cavities. Thereafter, at least a partial vacuum is pulled within the cavities to reduce the pressure therein. A measured vacuum or partial vacuum is established within the cavities or chambers and the pressure therein is measured over a period of time. Depending on the level of vacuum pulled on the pouches of the blister package, changes in measured pressure over time will give an indication of leakage. A conventional vacuum leak tester may be used to determine if leaks are present while simultaneously, the deflection of the bladder as measured using the pattern recognition camera will provide a verification of a seal defect and its location.

Most current test methods for blister packages are destructive, time consuming, not sensitive enough, not reliable under certain circumstances, and dependent on the properties of the package material.

This application outlines how multi-cavity blister packs can be non-destructively tested for leaks of all sizes, regardless of any print, type of defect, or the properties of the package material.

BRIEF DESCRIPTION OF THE DRAWINGS

A better understanding of the invention will be had with reference to the accompanying drawings wherein:

FIG. 1 is an illustrational view of a testing apparatus in accordance with the invention wherein a vacuum test chamber is shown in cross section;

FIG. 2 is a top plan view, on a smaller scale, of the vacuum testing apparatus of FIG. 1 showing a blister pack seated for testing;

DESCRIPTION OF THE PREFERRED EMBODIMENT

Figure 4:
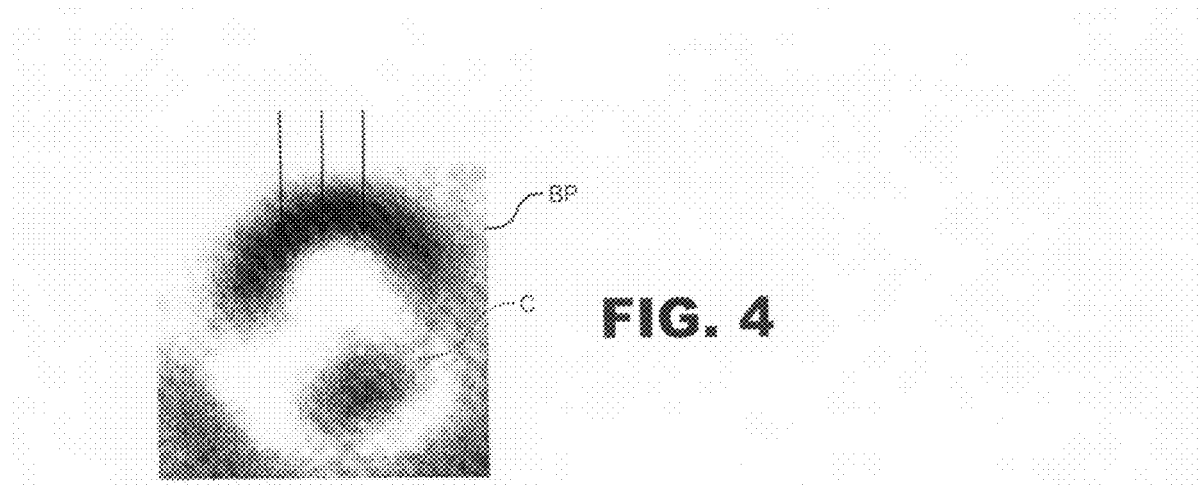
FIG. 4 is an enlarged view of the failed seal for the failed pouch of FIG. 3.

The need for non-destructive reliable leak detection for small semi-rigid, flexible, and blister packages with multiple pouches has lead to the creation of the present method and apparatus. To detect all defects of a small package of this kind, an apparatus must be capable of detecting small defects as well as large defects. To reliably detect all defects of a small package, two methods of detection are used together to maximize the probability of accurate detection.

With continued reference to the drawings, small defects can be successfully detected using vacuum testing, measuring the absolute and differential pressure. To accomplish this, the testing apparatus 10 of the invention utilizes a rigid support tooling 11 having at least one enlarged cavity 12 therein in which one of a plurality of package specific inserts 14 are selectively received. Each insert 14 will having different configurations of small testing chambers 15 therein. In the embodiment shown, there are six chambers 15. The number and positioning of the chambers will depend upon the blister configuration of a blister package "BP" that is to be tested.

A typical blister package is formed having a support card or body "B" having a plurality of small pouches "C" formed therein in which a product "P", such a single dosage of a medication is housed. The product is sealed within the pouches "C" by welding or otherwise securing a covering film or flexible material layer "F" over each of the pouches. The covering material may be applied as a single sheet that is welded or secured about each separate pouch. As shown in FIG. 1, a peripheral edge of the blister package support card "B" supports the pouches such that they are positioned with the pocket or chamber areas 15 of the testing apparatus.

A flexible diaphragm or bladder 16 is used to increase the sensitivity of the test as well as adapt to the flexible covering material of the package, allowing for non-destructive testing. Large defects can be successfully detected measuring the physical displacement of air from the pouches of the package. Further, the configuration of the surface of the bladder after a test will provide a location of a seal defect as well as a verification of a leak. Outer peripheral edge portions 17 of the bladder 16 are mounted between upper and lower frames members 18 and 19 that are preferably fixedly mounted relative to the support tooling 11. The support tooling 11 may include an upstanding or raised ridge 20 that extend about an outer edge thereof for purposes of binding the edge portions 17 of the bladder 16 with the upper bladder mounting frame 18 and so as to insure that the bladder is tightly pressed over and against the flexible covering film or other material "F" covering the cavities of the blister package "BP" being tested. To further draw the bladder into tight engagement with the blister package, several first open branch channels 22, only one being shown in the drawing figures, are formed in the support tooling that communicate with a primary evacuation channel 24 that extends to a source of vacuum associated with a conventional vacuum package leak tester 25. Using vacuum testing analysis techniques such as those described in U.S. Pat. Nos. 5,111,684, 5,513,516 and 6,513,366, the contents of which are incorporated in their entirety herein by reference, the integrity of the blister package is tested.

Also communicating with the primary evacuation channel 24 and the leak tester 25 are second open branch channels 26 that communicate with the pockets or small testing chambers 15 of the inserts 14. In this manner, the spaces within the chambers are effectively placed under vacuum during testing of the blister packages to insure the integrity of the material seals relative to each small pouch of the blister package.

As at least a partial predetermined vacuum, that is, a predetermined reduced pressure, is established within the pockets forming the small test chambers, any changes in measured pressure over a period of time will give an indication of leakage of the pouches of the package under test. The pressures may be measured by appropriate transducers and accompanying amplifiers.

The testing device is thus designed with an exposed imperforate flexible diaphragm or wall that is adapted to make contact with the flexible or covering material portion of the blister package, serving several purposes. As stated, the imperforate flexible bladder 16 supports or protects the package seals when a vacuum is pulled within the test chambers or pockets 15, thereby avoiding any plastic deformation and peeling of the seal area. The flexible bladder or diaphragm also increases the sensitivity of the pressure measurements of the vacuum tester by increasing the ratio of air volume inside the package to air volume inside each small pouch. The flexible bladder is also exposed, allowing for sensors or a vision camera or other imaging device 30 to observe the displacement of the bladder relative to the spaces of defective package pouches. The flexible bladder ensures that, under vacuum conditions, a defective package pouch becomes deflated.

Compared to previous methods related to the same field of vacuum leak testing, the present technology provides an entirely new method of detection and benefits. The flexible bladder supports the seal area, making it a non-destructive test that applies no stress to a blister seal without defects. The flexible bladder under vacuum conditions, unlike other methods that keep a blister package pouch form after pressure has equalized, deflates blisters package pouches that are defective, thus providing very consistent displacement response of defective blister package pouches. The image capturing device or vision camera 30 requires only one image to determine the package quality and location of defects. To facilitate the image recognition using the camera 30, it is preferred to provide a low-angle dark field illumination device 32 that illuminates the surface of the bladder such that unique patterns of shading are created depending on the condition of the integrity of the seals or the package pouches. The dark field illumination is normally produced from one side of the test tooling, creating the unique shading profiles that are captured by the camera and which give an immediate indication of a defect in a package or pouch seal, the area of the defect and the type of defect.

The image from the camera or other imaging device is communicated, such as by a cable 32, to an operator/computer control and display console 35. Due to the consistent profile difference between a defective and non-defective blister package, detecting defects from non-defects is very effective. The results of the testing using the method and apparatus of the present invention are also not adversely affected by any print and reflectivity of the package surface, making the present method of testing a valid solution for inspecting any blister package with flexible or semi-flexible seal/surface material. Further, the software associated with the camera and control console should include "self-teach" programming such that the system is capable of developing profiles indicative of different conditions that may affect the integrity of the blister package pouch seals.

In the use of the seal testing apparatus of the present invention, the blister packaging is placed in the rigid support tooling and the flexible bladder positioned so as to cover the package under test. At least a partial vacuum is created on the blister pack and the conventional vacuum leak tester is used to make a first indication of the integrity of the package seals. Given enough time and high enough vacuum level, the chamber or testing device of the invention can deflate a blister pouch with a 5-micron leak size in a reasonably short time that is necessary for testing under speeds associated with industrial packaging lines.

Figure 3:
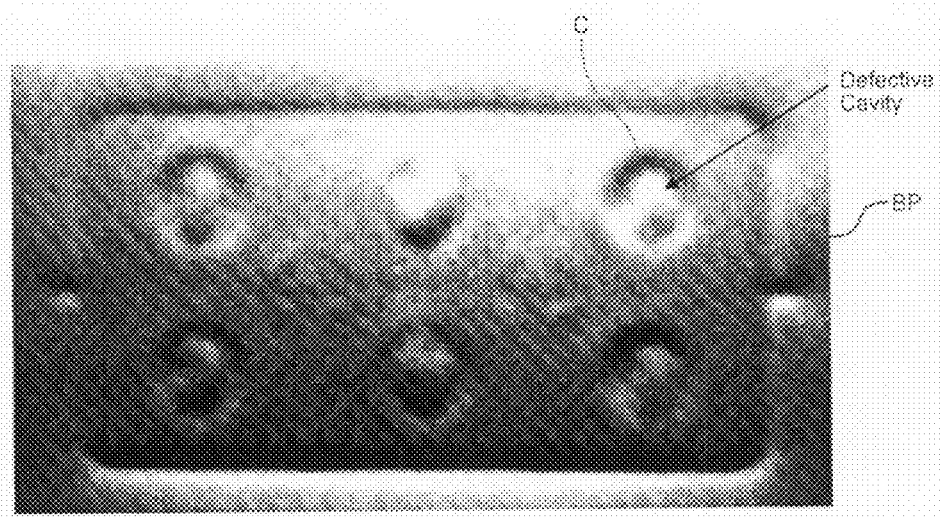
FIG. 3 is a photograph of a top view of a blister package covered by a bladder of the present invention showing the product containing pouches under test conditions in accordance with the teachings of the present invention and showing a failed seal for one of the pouches.
Figure 5:
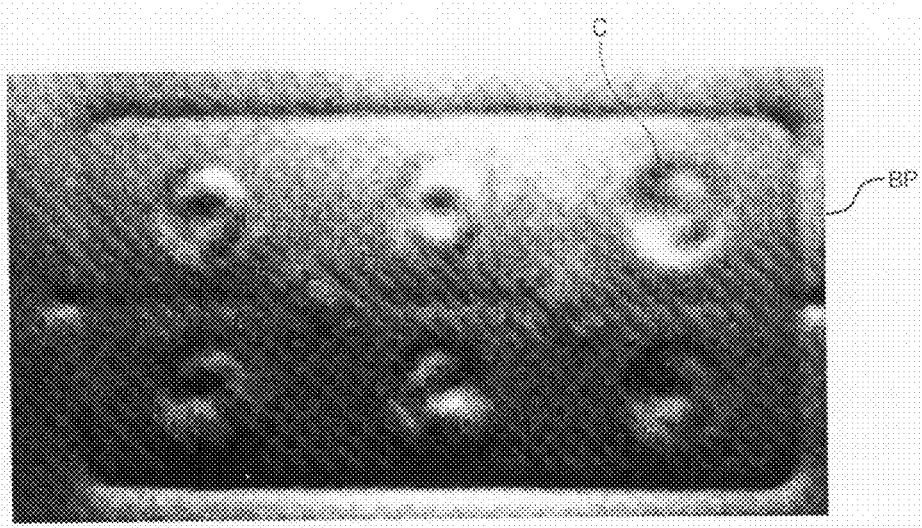
FIG. 5 is a photograph of a top plan view of a blister package covered by a bladder of the present invention showing the product containing pouches under test conditions in accordance with the teachings of the present invention and showing no seal failures.

The profile of a defective blister pouch is distinct and is also detected visually, see FIGS. 3-5. Simultaneously with the vacuum leak testing, the low angle light fixture illuminates the surface of the bladder to create a pattern that is recorded or recognized using the pattern recognition camera. To accentuate the distinction between defective and non-defective blister pouches, the low-angle dark field illumination creates unique patterns of shading. Dark field illumination is produced from one side of the test tooling, creating a shading profile. A defective cavity will deflate, causing a shaded area on the lighted side, and a lit area on the unlit side, see FIGS. 3 and 4. In the center of the pouch is the product, causing the opposite pattern. The vision camera captures an image of the blister package, and analyzes each blister pouch for shading patterns using various image analysis tools for matches to determine defective blister cavity profiles. The defective pouches are always deflated due to the flexible chamber wall and produce a consistent pattern that is detected, while the non-defective cavities, see FIG. 5, have uncertain shading patterns.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

We claim:

1. A method of testing for seal and other packaging defects in blister-like packaging wherein the packaging includes at least one product receiving pouch having a flexible surface covering using a vacuum tester and an image analyzer, the method comprising the steps of:
   A. placing the package in a test chamber such that the at least one pouch is supported within the test chamber;
   B. covering the flexible surface of the at least one pouch within the test chamber with an imperforate flexible bladder;
   C. applying at least a partial vacuum to the package using a vacuum leak tester to determine the integrity of the at least one pouch; and
   D. taking an image of the bladder during the application of the at least partial vacuum to obtain a visual analysis of the integrity of the at least one pouch.

2. The method of claim 1 including creating an illumination pattern over the surface of the bladder while taking the image of the bladder.

3. The method of claim 2 including illuminating the surface of the bladder with a low-angle dark field illumination device.

4. An apparatus for testing for seal and other packaging defects in blister-like packages having at least one product receiving pouch sealed by a surface covering, the apparatus comprising; a support tool having at least one test chamber for receiving the at least one pouch therein, a flexible generally imperforate bladder for covering the at least one pouch in such a manner so as to cover the surface covering of a pouch placed within said at least one test chamber, a vacuum producing means for creating at least a partial vacuum within said at least one test chamber and a vacuum leak tester for determining an integrity of the pouch therein, means for imaging said bladder during the creating of the at least partial vacuum and means for analyzing an image obtained to give an indication of integrity of the pouch.

5. The apparatus of claim 4 including means for illumination a surface of said bladder during the creating of at least a partial vacuum to thereby create image patterns on an outer surface of said bladder.

6. The apparatus of claim 5 wherein said means for illuminating includes a low-angle dark field illumination device.

7. The apparatus of claim 5 wherein the image is recorded by a camera.

8. The apparatus of claim 7 wherein said means for illuminating includes a low-angle dark field illumination device.

* * * * *